United States Patent Office 3,051,676
Patented Aug. 28, 1962

3,051,676
SOLUTIONS OF POLY-N-VINYL-5-METHYL-2-OXA-
ZOLIDINONE CONTAINING ALKYL DIPHENYL
ETHER SULFONATE
William W. Bakke, Midland, Mich., assignor to The Dow
Chemical Company, Midland, Mich., a corporation of
Delaware
No Drawing. Filed Aug. 24, 1960, Ser. No. 51,483
8 Claims. (Cl. 260—29.6)

The present invention relates to new and useful aqueous solutions of poly-N-vinyl 5-methyl-2-oxazolidinone (hereinafter referred to as PVO–M), which solutions are substantially, if not entirely, free of "cloud point" effects and which comprise advantageous admixtures of various alkyl diphenyl ether sulfonates with water in the solvent media.

PVO–M is a water-soluble polymer of recent origin, having been recently disclosed in U.S. Patent No. 2,919,279. This polymer has many exceptionally beneficial and remarkable characteristics and properties. By way of illustration, PVO–M has unusual capacity for and the pronounced capability of attracting and accepting many of a wide variety of dyestuffs, including vat, acid, acetate, direct, naphthol and sulfur dyes. This property makes the polymer significantly attractive as a dye-assisting adjuvant for many synthetic textile fibers that are normally difficult, if not impossible, to dye and in which the PVO–M may be incorporated. It may also be utilized with benefit as a dye-stripping agent for removing dyestuffs from various colored textile goods and materials. Additionally, PVO–M can be used as a dye-leveling agent for promoting level control of dyeing.

While PVO–M is a water-soluble resinous material, its solubility in aqueous media is not general or entirely unrestricted. Thus, although PVO–M in broad molecular weight ranges up to about 100,000 to 200,000 or so is quite soluble in water at normal room temperatures, the polymer is afflicted with the phenomenon of inverse solubility in water with increasing temperature. If a clear solution of PVO–M in water is heated, it becomes cloudy at temperatures in the neighborhood of 40° C., depending upon the particular molecular weight range of the polymer under observation. Aaccordingly, the cloud point in aqueous solution of PVO–M having a Fikentscher K-value greater than about 30 is usually about 35° C. Lower K-value polymers, such as those with K-values of, say, 12 or 16, have cloud points in water of about 43° C. or so. At temperatures that are about 10 centigrade degrees higher than the cloud point of the PVO–M in aqueous solution, the polymer generally separates from the solvent vehicle in the form of a sticky, frequently difficult-to-handle mass.

For many applications, the indicated characteristics are not of material consequence. In certain instances, however, they may be of decided disadvantage. Thus, one of the attractive utilities of PVO–M is as a dye-receptor for acrylonitrile polymer compositions.

One highly advantageous technique for providing such compositions, particularly when polyacrylonitrile based fiber products are involved, is to apply or impregnate the PVO–M from an aqueous solution of relatively low polymer solids content to a shaped acrylonitrile polymer article that is an aquagel condition. Thus, an acrylonitrile polymer filamentary article that, pursuant to a well known procedure, has been salt spun in a wet spinning operation from an aqueous saline spinning solution may be conveniently passed, after its coagulation and while it is still in an aquagel or highly hydrated condition, through an aqueous bath containing the dissolved PVO–M in order to impregnate the filament with the dye-assisting polymer adjuvant. It is sometimes desirable in such an operation to employ a heated impregnating bath. However, as is evident, such condition may cause precipitation of the polymer due to its inverse solubility characteristics above about 40° C. or so. This may tend to complicate the impregnation operation.

Likewise, in dye stripping and in dye leveling processes, better results are oftentimes achieved when the textile product (such as a cloth, fabric, or other textile goods) is treated in and by means of a hot or boiling aqueous bath in order to achieve the desired ends.

It would be an advantage, and it is the chief aim and concern of the present invention, to provide applicating or treating solutions of PVO–M having a greater and more extended range of solubility, even under conditions of considerably high temperature, and which are not hampered for use by undesired cloud point characteristics. The inherent benefit of such aqueous solutions of the polymer for use in various treatments of textiles as well as for other applications is manifest in the foregoing and is further evident in the ensuing description and specification.

In accordance with the present invention, highly advantageous applicating and treating solutions of PVO–M are comprised essentialy of an aqueous solution of the polymer, wherein the solvent media consists of water that is mixed with such a quantity of a normally water-soluble or miscible alkyl diphenyl ether sulfonate as will raise the cloud point of the polymer substantially above its cloud point in pure water, and preferably will completely eliminate such phenomenon.

As another important feature of the invention, highly advantageous applicating and treating solutions of PVO–M are provided wherein the aqueous solvent media is strongly basic. Such basicity may be the result of, for instance, the aqueous solvent media containing water-soluble bases or basic salts, or containing both bases and salts. Under these conditions, the solvent media is mixed with such a quantity of a normally water-soluble or miscible alkyl diphenyl ether sulfonate as will raise the cloud point of the polymer substantially above its cloud point in the same basic aqueous solvent media without the pressure of the sulfonate.

The effective proportions of the water and alkyl diphenyl ether sulfonate for constituting the solvent media of the present compositions varies in a more or less unpredictable manner with the particular sulfonate involved and, oftentimes more noticeably, with the K-value of the PVO–M in solution. The effect of polymer concentration is generally not too discernible, although some differences are involved with different concentrations of polymer in the mixed solvent.

Ordinarily, the aqueous mixtures of the present invention, when the admixed constituents of the solvent vehicle have been properly proportioned, are capable of dissolving up to at least about 20 percent by weight of the polymer, and frequently up to as much as 50 or more weight percent of the polymeric solute, based on the weight of the resulting solution. In any event, the precise proportioning of the alkyl diphenyl ether sulfonate aqueous solvent vehicle is a matter of simple and straightforward test for the investigator and not much more difficult than the taking of temperature readings or the observation of other data.

To illustrate, a mixture of the sulfonate in water can be prepared and tested for its cloud point characteristics as a solvent for PVO-M by merely dissolving the polymer in the prepared solvent and observing at what temperature, if any, a cloud point is noticed. From such elementary manipulations, one can readily judge, in any given situation (taking into account the desired temperature at which the resulting solution is intended to be employed), whether the solvent mixture requires adjustment by addition of one or the other constituents thereto.

The alkyl diphenyl ether sulfonates that are employed in the practice of the present invention are all soluble in water and in aqueous solutions of acids, bases or salts. More specifically, those alkyl diphenyl ether sulfonates are utilized which are described by the formula:

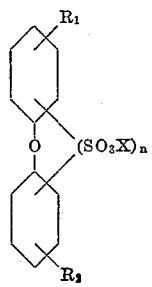

wherein:

$R_1$ is an alkyl radical containing 9 to 15 carbon atoms
$R_2$ is an alkyl radical containing 9 to 15 carbon atoms or hydrogen,
X is an alkali metal, ammonium or hydrogen, and
$n$ is 1 or 2.

A method of preparing the alkyl diphenyl ether sulfonates intended for use in the herein described invention is disclosed in U.S. Patent No. 2,854,477. Thus, typical of the sulfonates that may be used with benefit are: monododecyl diphenyl ether sodium sulfonate (alternatively referred to as dodecyldiphenyl oxide sulfonic acid, sodium salt); didodecyl diphenyl ether sodium sulfonate; monododecyl diphenyl ether disodium sulfonate; didodecyl diphenyl ether disodium sulfonate; mono- and di-nonyl diphenyl ether mono- and di-sodium sulfonates; mono- and di-pentadecyl mono- and di-sodium sulfonates; or, as a more specific embodiment with different nomenclature, disodium-2,2'-oxybis (4-dodecylbenzenesulfonate).

Other typical sulfonates are readily obvious by substituting other alkali metals or ammonium for sodium in the aforementioned compounds. The hydrogen form (which may also be employed) is, of course, a sulfonic acid. In this connection, in the case of the disulfonates, it is apparent that one of the sulfonate groups may be in the form of the acid and the other in the form of one of the salts. In the preferred embodiment of the invention, the salt forms of the sulfonates are used.

It is readily apparent to those skilled in the art of preparation of the sulfonates as above described by sulfonation of an alkyl diphenyl ether that, most frequently, a mixture of several sulfonates results. Also, the exact position or positions of substitution of the sulfonate group on the diphenyl ether nucleus is variant and frequently indeterminable. The exact position of the sulfonate group on the nucleus is immaterial for purposes of the present invention. It is to be understood that a mixture of two or more of the sulfonates, as well as a single species, may be employed with advantage in the practice of the present invention.

It is surprising to note the improvement in the cloud point of the aqueous polymer solutions which have been made basic by the inclusion of strong bases, such as alkali metal hydroxides, e.g., sodium hydroxide. This is particularly so when other commonly known wetting agents, many containing sulfonate groups, actually depress the cloud point of PVO-M in basic solutions.

Basic or alkaline aqueous solutions of PVO-M are frequently encountered when PVO-M is used in dye stripping or leveling processes. As is well known, alkaline conditions are necessary in many dyeing and stripping operations in order to have proper reducing conditions to solubilize the dyestuff. Usually, sodium hydroxide and a reducing agent such as sodium hydrosulfite or the sodium and zinc salts of sulfoxylate-formaldehyde compounds are used to provide suitable solubilizing and reducing media.

As mentioned before, the effect of the amount of polymer in the solution on the cloud point is generally not too noticeable. The apparent criticality lies in the ratio of the amount of alkyl diphenyl ether sulfonate to the amount of PVO-M. In some systems, the total amount of the sulfonate in the resulting solution will have a noticeable effect on the cloud point. For instance, in two water solutions of PVO-M containing the same ratio of sulfonate to PVO-M, the solution with the greater amount of the sulfonate will generally have the higher cloud point. Actually, only very small quantities of the sulfonate need be present to raise the cloud point of PVO-M. Usually, about 1 part of sulfonate to 5 parts PVO-M produces advantageous increases in the cloud point. At ratios approaching 10:1 sulfonate to PVO-M the cloud point approaches that of the boiling point. Suitably useful quantities are in the range of from 1:1 to 5:1. Generally, slightly greater quantities of an alkyl diphenyl ether sulfonate are required to effectively raise the cloud point of an aqueous solution of polymer which contains salts and bases than would be expected to raise an equal increment a similar solution consisting only of polymer and water.

By way of further illustration, several samples of PVO-M having a K-value of 30 were dissolved in 200 grams of water and to the resulting solutions was added in differing amounts a mixture of about 80 percent dodecyl diphenyl ether disodium sulfate and about 20 percent didodecyl diphenyl ether disodium sulfate. The cloud points of the resulting solutions were then determined. These results are tabulated in Table I.

*Table I*

| Grams PVO-M | Grams alkyl diphenyl either sulfonate mixture | Cloud point, ° C. | Ratio sulfonate/ PVO-M |
|---|---|---|---|
| 0.15 | ------ | 37 | ------ |
| 0.15 | 0.05 | 48 | 1/3 |
| 0.15 | 0.10 | 58 | 2/3 |
| 0.15 | 0.15 | 68 | 1/1 |
| 0.15 | 0.30 | 74 | 2/1 |
| 0.15 | 0.45 | 82 | 3/1 |
| 0.15 | 0.75 | >90 | 5/1 |
| 0.75 | ------ | 36 | ------ |
| 0.75 | 0.25 | 58 | 1/3 |
| 0.75 | 0.50 | 67 | 2/3 |
| 0.75 | 0.75 | 75 | 1/1 |
| 0.75 | 1.50 | >90 | 2/1 |

In an additional illustration, to baths containing about 200 grams of water, 1.5 grams of sodium hydroxide, and 1.5 grams of sodium hydrosulfite there were added varying amounts of PVO-M having a K-value of about 30. To each bath was added either a commercially available surface active agent or an alkyl diphenyl ether sulfonate in accordance with the present invention. As shown in Table II, significant increases in the cloud point were effected with but little of the alkyl diphenyl ether sulfonate. It is also observed that other agents typically thought effective for this purpose actually depressed the cloud point, even when three times the amount of agent to PVO-M was employed.

Table II

| Grams PVO-M | Active agent | | | Cloud point | |
|---|---|---|---|---|---|
| | Grams | Trade name | Active chemical constituents | °C. | °F. |
| 0.70 | None | | | 32 | 90 |
| 0.70 | 0.20 | "Aerosol OT" | Sodium dioctyl sulfosuccinate | 21 | 70 |
| 0.70 | 0.35 | | Sodium xylene sulfonate | 26 | 78 |
| 0.70 | 0.35 | "Triton X-100" | Alkylarylpolyether alcohol | 27 | 81 |
| 0.30 | 0.90 | do | do | 31 | 87 |
| 0.70 | 0.35 | "Igepal CO-800" | Polymerized ethylene oxide-alkyl phenol condensation product | 27 | 81 |
| 0.70 | 0.35 | "Triton X-200" | Alkylarylpolyether sulfonate | 28 | 83 |
| 0.15 | 0.15 | | | 67 | 153 |
| 0.15 | 0.30 | | | 76 | 168 |
| 0.30 | 0.10 | | Mixture of about 80 percent dodecyl diphenyl ether disodium sulfonate and about 20 percent didodecyl diphenyl ether disodium sulfonate. | 40 | 104 |
| 0.30 | 0.20 | | | 58 | 136 |
| 0.30 | 0.30 | | | 67 | 153 |
| 0.30 | 1.50 | | | 83 | 181 |
| 0.75 | 0.74 | | | 70 | 158 |
| 0.75 | 0.86 | | | 73 | 163 |

In order to yet further illustrate the invention, a spinning solution comprised of about 10 parts of polyacrylonitrile dissolved in about 90 parts of a 60 percent aqueous solution of zinc chloride is salt spun by being extruded through a spinnerette having 750 orifices, each having a diameter of about 6 mils into an aqueous coagulating bath that contains about 42 percent by weight of zinc chloride dissolved therein to be spun into a multiple filament aquagel tow. The coagulated tow is washed substantially free from salt after being withdrawn from the coagulating bath and collected. There is thereby obtained an aquagel fiber containing about 2 parts of water for each part of polymer therein. About 1.5 grams (on a wet weight basis) of the aquagel fiber is immersed for about 20 minutes in an aqueous solution of PVO–M containing about 2.5 parts by weight of dissolved polymer in which the solvent consists of about 25 parts by weight pentadecyl diphenyl ether disodium sulfonate and 75 parts by weight water. The applicating solution is maintained at about 90° C. during the impregnation. The PVO–M employed has a Fikentscher K-value of about 20.2. After being impregnated for about 5 minutes, the polyacrylonitrile fiber is removed from the impregnating bath and dried at a temperature of about 150° C. for 15 minutes. The impregnated sample is found to be readily dyeable to deep and level shades of coloration when dyed in a conventional manner with 0.3 percent Sevron Brilliant Red 4G, a basic dyestuff, formerly known as Basic Red 4G (Colour Index Basic Red 14); 4 percent Calcodur Pink 2BL (Colour Index Direct Red 75) or with many other of a wide variety of dyestuffs. In contrast, when the same impregnating procedure is attempted with pure water solutions of the PVO–M temperatures greater than about 40° C. cannot be employed without incurring undesirable clouding and precipitating effects due to the inverse solubility of the polymer in water.

Certain changes and modifications in the practice of the present invention can be readily entered into without departing from its intended spirit and scope. Therefore, it is to be fully understood that the invention is not to be considered as being limited or in any way restricted to or by the preferred deictic embodiments thereof which are included in the foregoing description and specification. Rather, it is to be interpreted and construed in the light of what is set forth and defined in the hereto appended claims, taking into account the fact that poly-N-vinyl-4-methyl-2-oxazolidinone is generally equivalent to poly-N-vinyl-5-methyl-2-oxazolidinone and that identical results are obtained when the latter isomer is entirely or only partially replaced with the former and that both species, for present purposes, are adapted for utilization in the practice of the present invention, and intended to be covered thereby.

What is claimed is:

1. An aqueous solution of poly-N-vinyl-5-methyl-2-oxazolidinone which comprises said polymer dissolved in an aqueous solvent vehicle consisting essentially of water mixed with at least one alkyl diphenyl ether sulfonate of the formula:

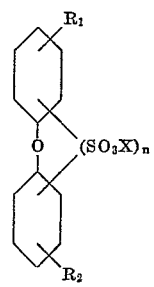

wherein:
R₁ is an alkyl radical containing 9 to 15 carbon atoms,
R₂ is selected from the group consisting of hydrogen and an alkyl radical containing 9 to 15 carbon atoms,
X is selected from the group consisting of an alkali metal, ammonium and hydrogen, and
$n$ is 1 or 2;
said alkyl diphenyl ether sulfonate being present in said aqueous solvent vehicle in an amount such that the cloud point of the polymer in the resulting solution is increased in comparison with the cloud point of the same polymer at the same concentration in the same said aqueous solvent vehicle not containing said alkyl diphenyl ether sulfonate.

2. The solution of claim 1, wherein said alkyl diphenyl ether sulfonate is dodecyl diphenyl ether disodium sulfonate.

3. The solution of claim 1, wherein said alkyl diphenyl ether sulfonate is didodecyl diphenyl ether disodium sulfonate.

4. The solution of claim 1, wherein said mixture consists of dodecyl diphenyl ether disodium sulfonate and didodecyl diphenyl ether disodium sulfonate.

5. The solution of claim 4, wherein said mixture consists of about 80 percent dodecyl diphenyl ether disodium sulfonate and about 20 percent didodecyl diphenyl ether disodium sulfonate, based on the weight of the mixture.

6. The solution of claim 1 which contains, by weight, from about one-fifth part to about 10 parts of said alkyl diphenyl ether sulfonate per part of poly-N-vinyl-5-methyl-2-oxazolidinone.

7. The solution of claim 1, wherein said aqueous solvent vehicle is an alkaline aqueous solvent vehicle.

8. The solution of claim 7, wherein said alkaline aqueous solvent vehicle consists essentially of water containing minor proportions of sodium hydroxide and sodium hydrosulfite.

References Cited in the file of this patent

UNITED STATES PATENTS

| 2,854,477 | Steinhauer | Sept. 30, 1958 |
| 2,919,279 | Walles et al. | Dec. 29, 1959 |
| 2,948,656 | Tousignant et al. | Aug. 9, 1960 |